United States Patent
Cruz et al.

(10) Patent No.: US 11,939,112 B2
(45) Date of Patent: Mar. 26, 2024

(54) TRAY COMPOSITE, PACKAGE AND METHOD

(71) Applicant: AMCOR FLEXIBLES NORTH AMERICA, INC., Neenah, WI (US)

(72) Inventors: Tara Kay Cruz, Appleton, WI (US); Andrew J. Lischefski, Kangasala (FI); Hanna-Mari Lahti, Lempäälä (FI); Kalle Nattinen, Tempere (FI)

(73) Assignee: AMCOR FLEXIBLES NORTH AMERICA, INC., Neenah, WI (US)

( * ) Notice: Subject to any disclaimer, the term of this patent is extended or adjusted under 35 U.S.C. 154(b) by 409 days.

(21) Appl. No.: 17/312,764

(22) PCT Filed: Dec. 27, 2018

(86) PCT No.: PCT/US2018/067668
§ 371 (c)(1),
(2) Date: Jun. 10, 2021

(87) PCT Pub. No.: WO2020/139342
PCT Pub. Date: Jul. 2, 2020

(65) Prior Publication Data
US 2022/0048673 A1   Feb. 17, 2022

(51) Int. Cl.
*B65D 25/14* (2006.01)
*B65D 1/34* (2006.01)
(Continued)

(52) U.S. Cl.
CPC .......... *B65D 25/14* (2013.01); *B65D 1/34* (2013.01); *B65D 77/2024* (2013.01); *B65D 81/343* (2013.01)

(58) Field of Classification Search
CPC ...... B65D 25/14; B65D 1/34; B65D 77/2024; B65D 81/343
(Continued)

(56) References Cited

U.S. PATENT DOCUMENTS 6,391,402 B1  5/2002  Yokota et al.
6,787,205 B1  9/2004  Aho et al.
(Continued)

FOREIGN PATENT DOCUMENTS

EP   2965997 A1    1/2016
JP   2000344224 A  12/2000
(Continued)

OTHER PUBLICATIONS

PCT International Search Report, international application No. PCT/US2018/067668, dated Mar. 26, 2019, 2 pages.

*Primary Examiner* — Jacob K Ackun

(57) ABSTRACT

A tray composite comprises a polymeric based liner including an exterior surface layer, an interior surface layer, and a formed base removably affixed to the interior surface layer of the polymeric based liner. A formed base is removably affixed to the interior surface layer of the polymeric based liner. The polymeric based liner and the formed base are manually separable after they have been removably affixed together by a first portion of the interior surface layer remaining affixed to the formed base and a second portion of the interior surface layer separating from the first portion of the interior surface layer.

15 Claims, 7 Drawing Sheets

(51) Int. Cl.
*B65D 77/20* (2006.01)
*B65D 81/34* (2006.01)

(58) Field of Classification Search
USPC .......................................................... 206/557
See application file for complete search history.

(56) References Cited

U.S. PATENT DOCUMENTS

| | | |
|---|---|---|
| 7,721,910 B2 | 5/2010 | Wallace |
| 9,498,917 B2 | 11/2016 | Slack |
| 10,000,314 B2 | 6/2018 | Slack |
| 2006/0172131 A1 | 8/2006 | Haedt et al. |
| 2007/0131679 A1 | 6/2007 | Edwards et al. |
| 2011/0259512 A1 | 10/2011 | Daelmans et al. |
| 2012/0228306 A1* | 9/2012 | Wallace ............... B65D 81/262 |
| | | 220/501 |
| 2015/0136764 A1 | 5/2015 | Dropsy et al. |
| 2017/0253368 A1* | 9/2017 | Wilson .................... B65D 5/30 |
| 2018/0022529 A1 | 1/2018 | Tye |
| 2018/0319568 A1 | 11/2018 | Tye |
| 2022/0072761 A1* | 3/2022 | Versluys ................. B29C 51/04 |
| 2023/0159251 A1* | 5/2023 | Perna ...................... B32B 27/08 |
| | | 220/359.2 |
| 2023/0271767 A1* | 8/2023 | Lahti ................... B65D 81/343 |
| | | 206/557 |

FOREIGN PATENT DOCUMENTS

| | | |
|---|---|---|
| JP | 2002096813 A | 4/2002 |
| WO | 2012122427 A3 | 9/2012 |
| WO | 2015009518 A1 | 1/2015 |
| WO | 2015051107 A1 | 4/2015 |
| WO | 2016033682 A1 | 3/2016 |
| WO | 2017158233 A1 | 9/2017 |

* cited by examiner

TRAY COMPOSITE, PACKAGE AND METHOD

BACKGROUND

This application is related to packaging suitable to hold a product component at one time and then aid in separation of the packaging parts for more environmentally friendly disposal after use of the product. Specifically, the packaging can be designed for food storage and oven cooking without compromising its integrity during use and separation for disposability post use.

Formed base trays with polymeric based liners have been used for many applications. These applications include packaging for various items, including industrial or consumer goods products and food products. A formed base of the tray has advantages of low cost, low weight, recyclability, thermal insulation, tangible haptics and high stiffness. The polymer based liner is added to enhance the physical properties of the tray, including sealing properties, moisture resistance, gas barrier, grease and flavor resistance and durability.

Often, the formed base is coated with a thin layer of polyethylene to achieve the benefits of a polymeric liner. However, more functionality can be obtained by using a premade polymeric liner, and adhering it to the formed base. Premade liners, primarily made of polymers, are used in some applications where the formed base and the polymeric liner might be separated for disposal. However, often manual separation can be difficult or results in too much of the formed base and/or the polymeric liner remaining adhered to each other after separation of the two components.

Formed base trays that are designed for ovenable applications have used liners made of high temperature resistant polymers. Liners made of high temperature resistant polymers can be difficult to adhere to the formed base and require an additional adhesive component between the former base and the liner. Additionally or alternately, the high temperature resistant polymeric liners can be even more difficult to remove from the formed based once they are adhered because of the added adherence caused by the heat.

SUMMARY

There is a need for a polymeric based liner for a formed tray that 1) can be removably affixed to a formed base of the tray, 2) can survive oven temperatures and conditions without separating prematurely from the formed base nor adhering too much, and 3) can be easily manually separated from the formed base, especially after being subject to oven temperatures, for disposal of the parts separately.

The present application describes a tray composite that includes a polymeric based liner. The liner includes an exterior surface layer and an interior surface layer. A formed base is removably affixed to the interior surface layer of the polymeric based liner. The polymeric based liner and the formed base are manually separable after they have been removably affixed together by a first portion of the interior surface layer remaining affixed to the formed base and a second portion of the interior surface layer separating from the first portion of the interior surface layer.

One embodiment of the present invention may include the same polymeric based liner and then the formed base removably affixed to the interior surface layer of the polymeric based liner across at least 90% of a surface area where the formed base is adjacent to the interior surface layer. The polymeric based liner and the formed base are manually separable after they have been removably affixed together by a first portion of the interior surface layer remaining affixed to the formed base and a second portion of the interior surface layer separating from the first portion of the interior surface layer. Further, when separated, an amount of the first portion of the interior surface layer affixed to the formed base is no more than 20% of a weight of the formed base, and the force to separate the polymeric based liner and the formed base is at least 30 N/m and no more than 450 N/m.

In another embodiment, the present invention may include the same polymeric based liner and then the formed base removably affixed to the interior surface layer of the polymeric based liner across at least 90% of a surface area where the formed base is adjacent to the interior surface layer. The polymeric based liner and the formed base are manually separable after they have been removably affixed together by a first portion of the interior surface layer remaining affixed to the formed base and a second portion of the interior surface layer separating from the first portion of the interior surface layer. Further, after exposure to 220° C. oven conditions for 45 minutes the polymeric based liner remains removably affixed to the formed base over at least 80% of the surface area that the polymeric based liner and the formed base were removably affixed prior to oven exposure.

Any of the embodiments of the tray composite may have at least one inner layer located between the exterior surface layer and the interior surface layer, and such inner layer may be a barrier layer.

Any of the embodiments of the tray composite may enable: a force to separate the polymeric based liner and the formed base to be at least 10 N/m and no more than 500 N/m; the polymeric based liner and the formed base are manually separable such that when separated an amount of the first portion of the interior surface layer affixed to the formed base is no more than 20% of a weight of the formed base; and/or, the formed base is removably affixed to the interior surface layer across at least 90% of a surface area where the formed base is adjacent to the interior surface layer.

Any of the embodiments of the tray composite may have: the interior surface layer with at least two sub-layers and a separation interface formed between the sub-layers such that manually separating the polymeric based liner and the formed base occurs at the separation interface within the interior surface layer; the first portion of the interior surface layer and the formed base composed of materials having a compatible recycling profile; and/or, the formed base being made of a polymeric constituent and the formed base polymeric constituent is the same as a polymeric constituent of the first portion of the interior surface layer remaining affixed to the formed base.

In any of the embodiments, if desired to better insure no leakage of a food product after separation of the polymeric based liner from the formed base, the exterior surface layer substantially maintains its structural integrity and is substantially uncompromised by the formed base being manually separated from the second portion of the interior surface layer, and/or the interior surface of the formed base substantially maintains its structural integrity and is substantially uncompromised when the second portion of the interior surface layer is manually separated from first portion of the polymeric based liner.

Any of the embodiments of the tray composite may be ovenable. For example, this may include the polymeric based liner being at least partially crosslinked. Additionally, or alternately, this may include the polymeric based liner remaining removably affixed to the formed base to between 80% and 300% of the extent in N/m that the polymeric based liner and the fiber based component were removably affixed prior to oven exposure, with oven exposure defined as exposing the tray composite to 220° C. oven conditions for 45 minutes. Additionally, or alternately, this may include the polymeric based liner remaining removably affixed to the formed base over at least 80% of the surface area that the polymeric based liner and the formed base were removably affixed prior to oven exposure.

Embodiments of the package may have a tray composite of any of the previous embodiments and include a lid and a food product. The food product is hermetically sealed between the lid and the exterior surface layer of the polymeric based liner.

Yet another embodiment of the invention is a method of using any of the tray composites, and their optional features, as previously described. The method includes: obtaining a polymeric based liner, the liner including an exterior surface layer and an interior surface layer; obtaining a formed base that is removably affixed to the interior surface layer of the polymeric based liner; and manually separating the polymeric based liner and the formed base after they have been removably affixed together by a first portion of the interior surface layer remaining affixed to the formed base and a second portion of the interior surface layer separating from the first portion of the interior surface layer.

In combination with the related explanations hereafter, the invention provides a compatible recycling profile that enhance use of the package while also enhancing recycling of the components and parts unlike before possible by inventively combining layers and sub-layers with one or more of these features: (i) made of the same general type of polymer, (ii) made of a different polymer types but can be processed in recycling because present in low enough concentrations (i.e. less than 20% to less than 5%), (iii) dissolvable in the recycling process, and/or (iv) generally otherwise acceptable in the recycling process.

BRIEF DESCRIPTION OF THE DRAWINGS

The disclosure may be more completely understood in consideration of the following detailed description of various embodiments of the disclosure in connection with the accompanying drawings, in which.

Figure 1:
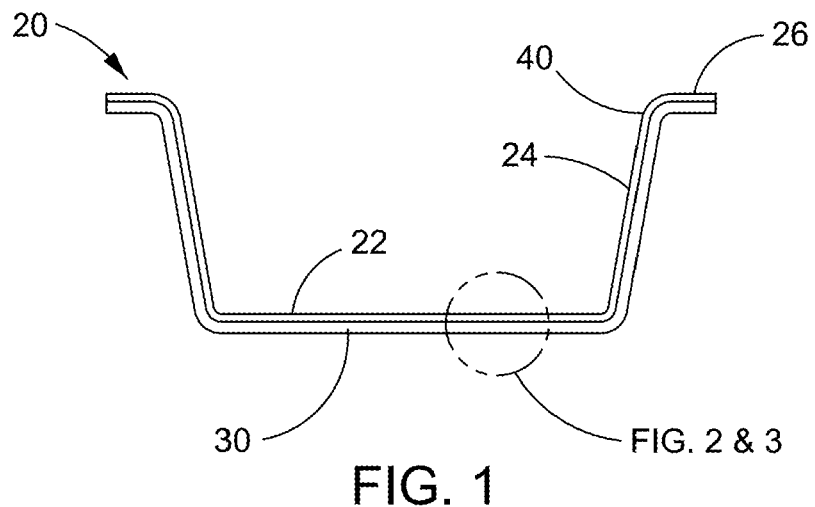
FIG. 1 is a cross-sectional view of an embodiment of a tray composite of the invention.
Figure 2:
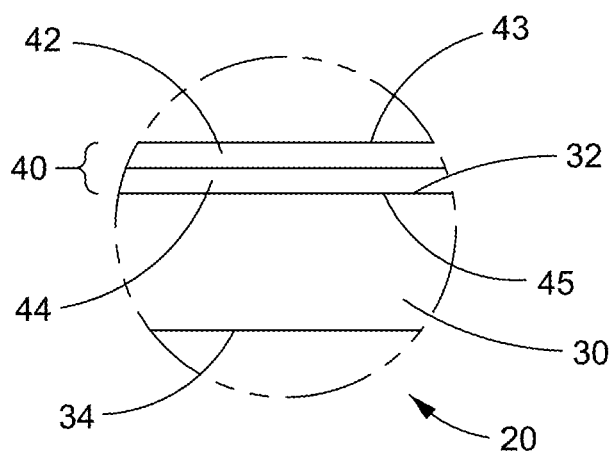
FIG. 2 is an enlarged view of a portion of that seen in FIG. 1, as noted.

The drawings show some but not all features and embodiments. The elements depicted in the drawings are illustrative and not necessarily to scale, and the same (or similar) reference numbers denote the same (or similar) features throughout the drawings.

DETAILED DESCRIPTION

In accordance with the practice of at least one embodiment of the present invention, as seen in FIGS. 9-12, a package (10) includes a tray composite (20), a lid (12) and a food product (16). The product can be hermetically sealed within the package at seal (14). The product can be packaged and distributed for institutional use, catering or retail sale, through room temperature, refrigerated or frozen conditions. The package can be designed to be able to withstand heating in an oven for either cooking or reheating the product packaged therein. After use, involving heating or not, the tray composite parts can be manually separated for desired recycling and/or disposal.

An embodiment of the tray composite (20) described herein is shown in FIGS. 1-2 and 4-5. The tray composite (20) includes a polymeric based liner (40), the liner including an exterior surface layer (42) and an interior surface layer (44). A formed base (30), with an exterior surface (34), is removably affixed to the interior surface layer (44) of the polymeric based liner (40). As seen in FIGS. 4-8, for example, it is the inventors' unexpected discovery and innovative development to construct and/or use the polymeric based liner that is manually separable from the formed base after they have been removably affixed together by a first portion (46) of the interior surface layer (44) remaining affixed to the formed base (30) and a second portion (48) of the interior surface layer (44) separating from the first portion (46) of the interior surface layer when the formed base (30) is separated from the polymeric based liner (40).

Without being limited to a theory of explanation, it is the inventor's design that the interior surface layer (44) is constructed with an internal bond strength weaker than (i) a bond strength of interior surface (45) of the polymeric based liner to interior surface (32) of the formed base and weaker than (ii) a bond strength of interior surface layer (44) of the polymeric based layer to exterior surface layer (42) of the polymeric based layer. It is in this way, as taught here, the invention significantly enhances the polymeric based liner (40) and the formed base (30) being manually separable (peeled apart by hand) after they have been removably affixed together, better than possible with other polymeric liners, and while also taking advantage of great adhesion of the polymeric based liner (40) and the formed base (30) for use of the package and until disposal is desired.

That is, one challenge the present invention addresses with tray composite (20) is insuring sufficient adhesion between the polymeric based liner (40) and the formed base (30) so they act as one during use. For example, this can mean the formed base is removably affixed to the interior surface layer (44) across at least 90% of a surface area where the formed base (30) is adjacent to the interior surface layer (44). And, even more preferably, the formed base is removably affixed to the interior surface layer across at least 92%, 94%, 96%, 98% or substantially all of the surface area where the formed base (30) is adjacent to the interior surface layer (44).

Opposite the challenge to insure enough adhesion, is the challenge to enable manual separation of the polymeric based liner (40) and the formed base (30) once the product has been used or consumed and now the tray composite (20) needs to be disposed of properly. Because these challenges oppose one another, enhancing one is at the detriment of the other, until discovery and development of the subject invention. Thus, there must be a balance between good adhesion during use of the tray composite and designed weakness or failure within one or more polymeric based liner layer(s) so the tray composite can be manually separated into its parts for disposal in a desirable way, e.g., an environmentally friendly way that enables recyclability per local regulations for doing so.

Figure 5:
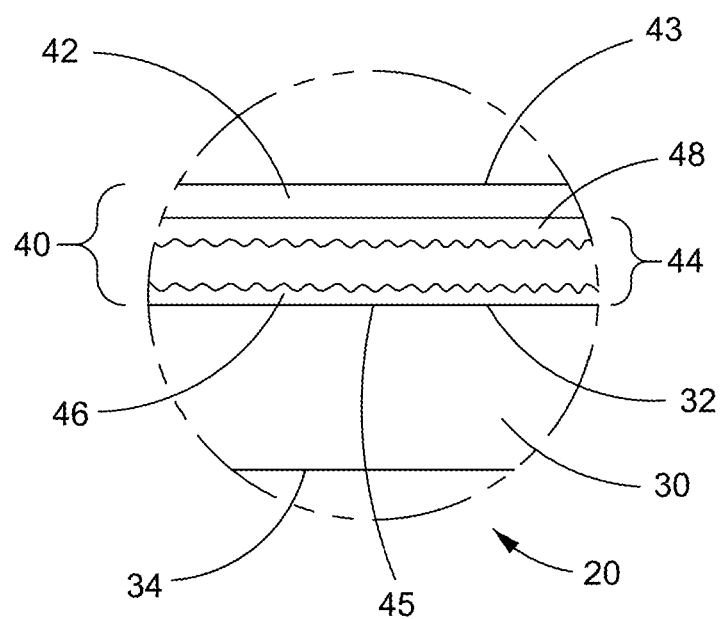
FIG. 5 is an enlarged view of a portion of that seen in FIG. 4, as noted, and the same embodiment as in FIG. 2.
Figure 6:
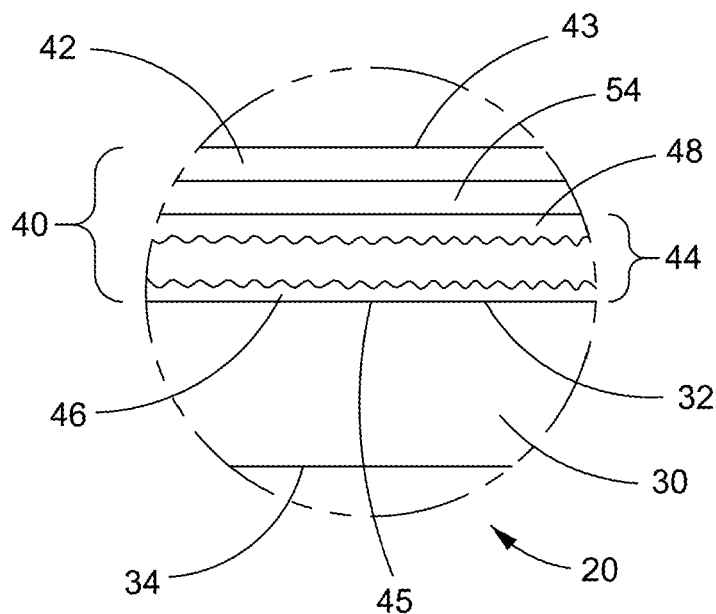
FIG. 6 is an enlarged view of a portion of that seen in FIG. 4, as noted, and also showing the alternative embodiment seen in FIG. 3.

Addressing these opposing challenges, in one embodiment of the invention the first portion (46) of the interior surface layer (44) and the formed base (30) are composed of materials having a compatible recycling profile. For example, both may be composed of the same polymeric constituent(s) (e.g., polyester, polyethylene, polyamide, modified polyethylene, ethylene vinyl acetate copolymer, ethylene vinyl alcohol copolymer, and others as are known in the art and could be used as a polymeric based liner of the invention) for obvious compatibility in both manufacture of the tray composite and recyclability. Alternately, the interior surface layer (44) can include at least two different polymeric constituents to further aid in compatibility in both manufacture of the tray composite and its recyclability and provide other benefits as discussed herein. For example, one benefit of these constituent variations and combinations can be to not only aid in separation, but also help achieve more adhesion in some areas versus others, e.g., at locations where a seal exists like (14) in FIGS. 9 to 12 to join a lid to the polymeric based liner (40) of package (10), while still balancing to not be too much adhesion that will prevent manual separation after use of the package. More particularly, in practice, the interior surface layer may be a substantially homogenous layer of one or more constituent, and this layer can be designed to practice the invention whereby, as seen in FIGS. 5 and 6, when first portion (46) of the interior surface layer (44) remains affixed to the formed base (30) and second portion (48) of the interior surface layer (44) separates from the first portion (46) of the interior surface layer, this occurs intralayer (i.e., within the same layer) and is represented by the jagged edges separating first portion (46) from second portion (48). Although not expressly shown, it is contemplated that the first portion (46) of the interior surface layer (44) may include one or more additional sub-layers located between formed base interior surface (32) and the separation zone formed when the first portion (46) is separated from second portion (48), for example, like sub-layer 50 seen in FIG. 8.

As an example of this embodiment, and in reference to FIG. 6 in one embodiment, the polymeric constituents in polymeric based liner (40) can be an exterior surface layer (42) comprising a sub-layer of polyester (or alternatively a double sub-layer of polyethylene and a modified polyethylene) next to inner layer (54) comprising a sub-layer of a conventional tie polymeric constituent (and optionally a first polyamide sub-layer attached inside thereto) sandwiching an ethylene vinyl alcohol copolymer sub-layer with a second conventional tie polymeric constituent sub-layer (and optionally a second polyamide sub-layer attached inside thereof next to the ethylene vinyl alcohol copolymer)(none of these three to five constituent sub-layers shown in detail, all part of layer (54)), and next to the interior surface layer (44) comprising a sub-layer of a polyethylene and polybutylene blend (or a polypropylene plus polybutylene blend, both the constituents here as are known in the art) shown with first portion separated from the second portion. Additionally, there may be one or more sub-layers located in the first portion (46) of layer (44) attached at interior surface (45), e.g., a 12% ethylene vinyl acetate sub-layer (not shown in detail) and one or more other sub-layer (not shown in detail) between the ethylene vinyl acetate sub-layer and the portion of polyethylene and polybutylene blend located in the first portion (46). The formed base (30) can comprise a fiber based or polymeric constituent, e.g., paperboard or high density polyethylene. As such, separation occurs intralayer in interior surface layer (44) within the polyethylene and polybutylene blend, leaving first portion (46) of the polyethylene and polybutylene blend sub-layer closer to interior surface (45) affixed to the formed base at interior surface (32), and second portion (48) of the polyethylene and polybutylene blend sub-later affixed to the exterior surface layer (42) via inner layer (54) connected therebetween as seen in FIG. 6. FIG. 5 is generally similar to FIG. 6 but excludes any inner layer between exterior surface layer (42) and interior surface layer (44). As additional examples of ways to make the polymeric based inventive interior surface layer with intralayer failure, suitable additions to a polymer constituent include: inorganic particles such as talc, mica or structured CaCO3; for ovenable embodiments, organic compounds that melt-recrystallize or decompose under heat work well; and in some polymer compositions of one or more polymer constituent, simple sugars work well.

Still alternately, in another embodiment, the interior surface layer (44) has at least two sub-layers, e.g., (50, 51, 51a in FIG. 7 and 50, 50a, 51 in FIG. 8) and a separation interface (52, 53) formed between the sub-layers such that manually separating the polymeric based liner (40) and the formed base (30) occurs at the separation interface (52, 53) within the interior surface layer (44). "At the separation interface" means separation occurs substantially at a polymeric layer interface and not by intralayer failure. Even more preferred, the first portion (46) of the polymeric based liner and the formed base are manually separable at only the separation interface, thus achieving near perfect to perfect separation without fibers or material from the first portion (46) being affixed to the second portion (48), or vice versa, after separation of the polymeric based liner from the formed base.

Figure 7:
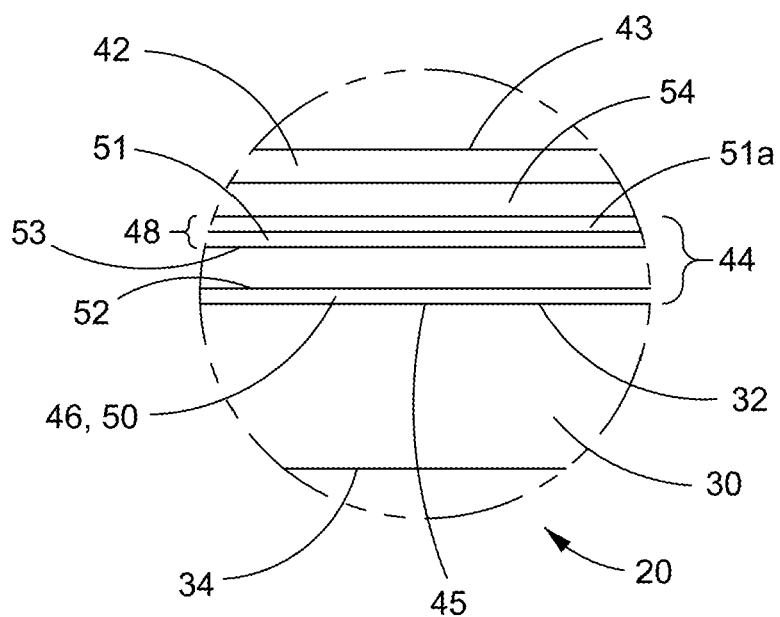
FIG. 7 is an enlarged view of a portion of that seen in FIG. 4, as noted, but also showing an alternative embodiment to that seen in FIG. 6.
Figure 8:
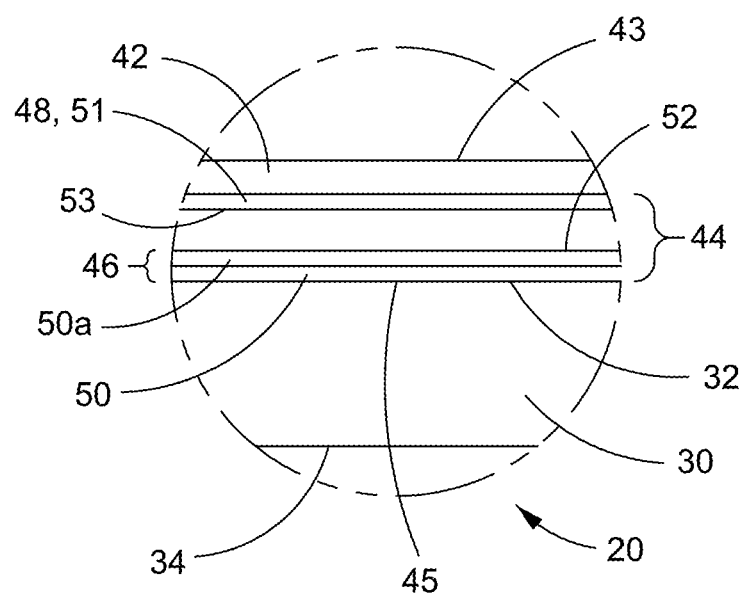
FIG. 8 is an enlarged view of a portion of that seen in FIG. 1, as noted, but also showing yet an alternative embodiment to that seen in FIG. 6.

As an example of this embodiment, and in reference to FIG. 7 in one embodiment, the polymeric constituents in polymeric based liner (40) can be an exterior surface layer (42) comprising a sub-layer of polyethylene at exterior surface (43) next to and sandwiching a first modified polyethylene tie sub-layer with nylon sub-layer (none of these three constituents shown in detail, but all part of layer (42)), then an inner layer (54) comprising ethylene vinyl alcohol copolymer, and next to this interior surface layer (44) comprising a sub-layer of nylon (51a) next to and sandwiching a second modified polyethylene tie sub-layer (51) with a sub-layer of polyester (46, 50) at the interior surface (45). The formed base (30) can comprise the polymeric constituent polyester. As such, separation occurs interlayer in layer (44) at the separation interface (52, 53) between the modified polyethylene tie sub-layer (51) and polyester sub-layer (46, 50), leaving this polyester sub-layer at interior surface (45) as the first portion (46) remains affixed to the formed base at interior surface (32). FIG. 8 is a similar but different embodiment of polymeric constituents, where two sub-layers (50, 50a) remain affixed to the formed base (30) after manual separation of the polymeric based liner from the formed base, and no inner layer is included. As an additional example, an advantageous material for making the polymeric based inventive interior surface layer is having the first portion of the interior surface layer (44) being a barrier type layer (e.g., Aquapak® Hydropol™ which is an O2 barrier) yet also compatible with disposability of a paperboard formed base, e.g., the barrier layer first portion dissolving in hot water during pulping of the separated formed base.

Further in regard to the proper balance of internal bond strength during use of the package and still enabling separability for disposal, another embodiment of the invention can be practiced so the polymeric based liner (40) and the formed base (30) are manually separable such that when separated an amount of first portion (46), based on weight of the first portion layer that remains affixed to the interior surface (32), is no more than 20%, 15%, 10%, 8%, 6% and more desirably is 5% or less of a weight of the formed base. Even more preferred, the polymeric based liner and the formed base can be manually separable such that when separated the amount of first portion (46), based on weight of the first portion (46) of the interior surface layer that remains affixed to the interior surface (32) of the formed base, is no more than 4%, 3% and is most desirably 2% or less of a weight of the formed base. Like this, and still more preferred, when the formed base is manually separated from the interior surface layer (44), the present invention now enables the user to substantially maintain and substantially not compromise the structural integrity of the exterior surface layer (42). That is, the act of manually separating will, desirably, not materially damage the exterior surface layer (42). When the tray composite includes an inner layer (54), like in FIGS. 6 and 7, then maintaining the structural integrity of the exterior surface layer (42) most likely also includes maintaining the structural integrity of the inner layer (54) and thereby better preserving the ability of the polymeric based liner to contain and separate package contents, e.g., food product pieces and parts and liquid, from the formed based when the polymeric based liner is separated from the formed base (e.g., FIGS. 4 to 8). Also preferred, alternately or additionally to this, when the formed base is manually separated from the interior surface layer (44), the present invention now enables the user to substantially maintain and substantially not compromise the structural integrity of the interior surface (32) of the formed base. That is, the act of manually separating will, desirably, not materially damage or alter that interior surface.

Still further concerning the proper balance between adhesion among and between layers and parts during use and still enabling separability for disposal, a force to separate the polymeric based liner (40) and the formed base (30) for disposal is at least 10 N/m and no more than 500 N/m. Yet more preferred, the force to separate the polymeric based liner and the formed base is at least 30 N/m and no more than 450 N/m. The separation of the liner (40) from the formed base (30) is measured using tensile testing equipment according to ASTM F904. In particular, all aspects of the F904 test procedure should be employed as stated in F904 to make the measurements needed to determine the force to separate the identified parts of the tray composite after the package is subject to its intended use, except as follows: Section 8.3 test five specimens from the material made in the longitudinal direction of the tray composite and test five specimens from the material made in the width direction (i.e., perpendicular to the longitudinal) with each set of five being its own force measurement contemplated by the invention here (and in the event the composite tray is square then picking one length or width direction as the longitudinal and the width as perpendicular to that), Section 10.1.1 condition for 40 hours, Section 11.1 only use mechanical means to start separation of the formed base from the polymeric based liner, Section 11.3.1 is used and not 11.3.2 nor 11.3.3, Section 12.1 is used and not 12.2.

Figure 3:
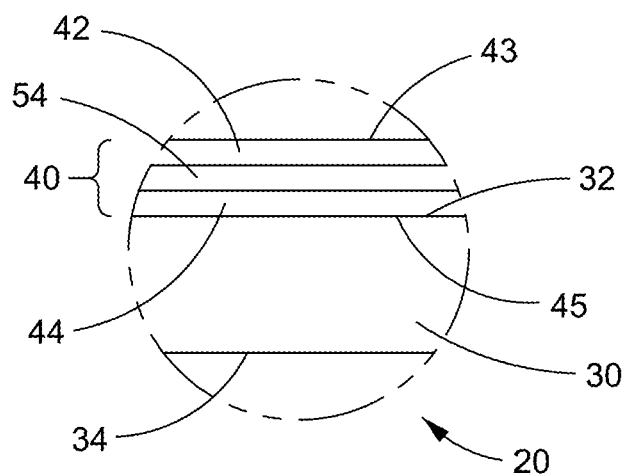
FIG. 3 is an enlarged view of a portion of that seen in FIG. 1, as noted, but also showing an alternative embodiment of the tray composite.
Figure 4:
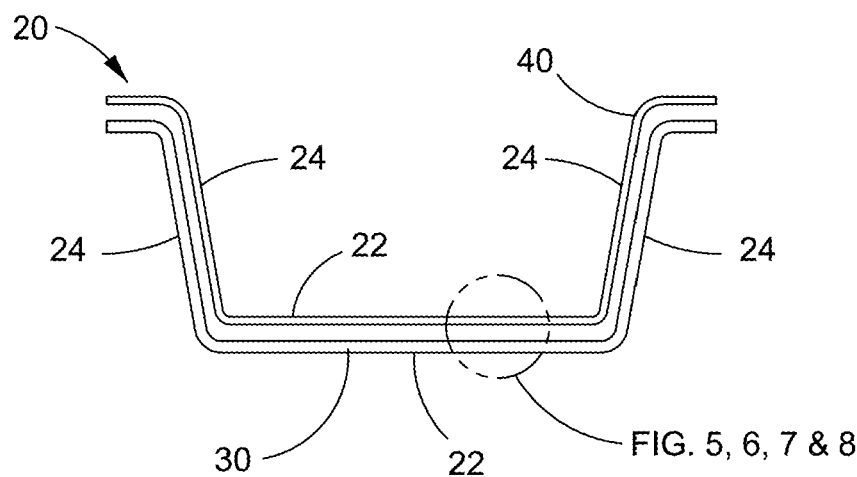
FIG. 4 is a cross-sectional view of the tray composite seen in FIG. 1, but now with the polymeric based liner separated from the formed base.

In a different embodiment of the present invention, for example seen in FIGS. 3, 6 and 7, the polymeric based liner (40) further comprises at least one inner layer (54) located between the exterior surface layer (42) and the interior surface layer (44). The polymeric based liner (40) optionally contains any number of inner layers that may include polymers for functionality such as, but not limited to, interlayer adhesion (such as modified polyethylene tie layers), barrier (reducing transmission of oxygen, moisture or other chemical species), or structural enhancement (enhancing thermoformability, puncture strength, etc.). The polymeric based liner can have a thickness from about 25 μm to 500 μm, or from about 50 μm to 300 μm.

In some embodiments, the tray composite is ovenable. For example, in part this can be achieved when the polymeric based liner is at least partially crosslinked within one or more of the polymer layers of the liner. The crosslinking can be achieved by any method, preferably irradiation from an electron beam generator, or as otherwise well known in the art. Crosslinking enhances the polymeric based liner properties such that it can better survive the conditions of oven cooking. The formed base may (i) be removably affixed to the crosslinked polymeric based liner, (ii) have a coating on or in its material(s) or (iii) a combination of (i) and (ii), to enhance its ovenability. Typical coatings for ovenable fiber based materials include clay or polyester. Clay pigment coatings typically contain white mineral or organic pigments, a polymeric latex binder and auxiliaries. The inks used for printing may be ovenable. Ovenable cardboard products such as PrintKote® are available from WestRock Company.

Figure 13:
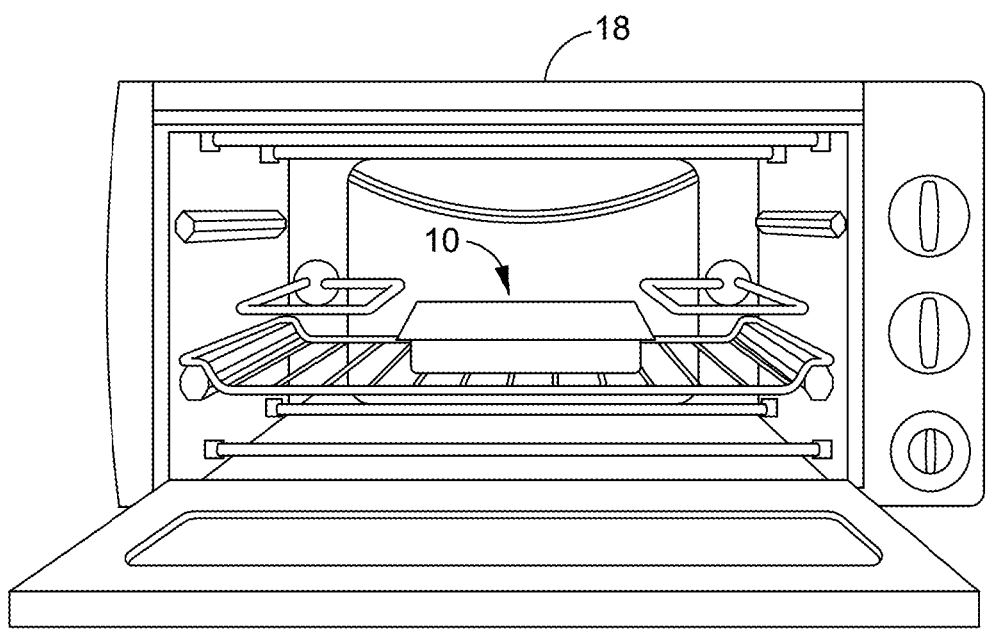
FIG. 13 is a view of an embodiment of a package in an oven.

FIG. 13 shows the package (10) inside an oven (18). As used in this application, a polymeric based liner is heat resistant if it resists at least some separation from the formed base while experiencing heat and potential pressure increase (pressure internal to a fully or partially sealed package). This can be advantageous because, after exposure up to and including 125° C., 150° C., 175° C., 200° C. and 220° C. oven conditions for 15 up to 45 minutes, the polymeric based liner remains removably affixed to the formed base to between 90% and up to 100%, 150%, 200%, 250% and even 300% of the extent in N/m that the polymeric based liner and the formed base were removably affixed prior to oven exposure. For example, pre-ovening it may take 50 N/m to manually separate the formed base from the polymeric based liner, and after ovening it may take 150 N/m to manually separate the formed base from the polymeric based liner. This still obtains the separation taught by the invention as there will be good manual separation and the separated liner integrity is sufficiently maintained throughout the exterior surface layer (42) of the polymeric based liner. And, as compared to a liner without the inventive interior surface layer (44), the layer (44) helps lower the extent in N/m it will take to separate the formed base from the polymeric based liner after ovening the tray composite and also makes the force needed to manually separate the desired layers more consistent across a wider variety of conditions under which the materials were attached when constructing the tray composite and/or when heating the tray composite. Again, all this is achieving that very difficult balance of enough adhesion but not too much. Without the present invention, the adhesion between the formed base and the polymeric based liner is either too little before and/or after ovening and pre-mature separation occurs, or adhesion is too much after ovening and manual separation is difficult to impossible without substantial tearing of the tray composite at a location other than the interior surface layer (44). Tensile testing equipment employed according to ASTM F904, and as instructed above, is used here also to determine the average force in N/m to separate the formed base from the polymeric based liner before, and then after, the package is subject to the oven temperatures for the stated time. Said another way, and also preferred, the polymeric based liner remains removably affixed to the formed base over at least 80%, 85%, 90%, 95%, to substantially all, most preferably, of the surface area that the polymeric based liner and the formed base were removably affixed prior to oven exposure.

The formed base of the tray composite can be, but is not limited to, paperboard, paper or other fiber based materials. The formed base can be a formable paper or a paperboard blank that can be folded into a tray type configuration, either before or after joining the innovative polymer based liner thereto. For example, such a blank as made by Halopak® by Packable B.V. of Almelo, The Netherlands (and see www.halopack.eu also) and its tray composite forming process, can be used. The formed base may have a part manufactured by a molded pulp process or a part produced directly from a natural raw material like wood or bamboo. The formed base may be part manufactured from polymer fibers. The formed base may be a single layer or multiple layers. A multilayer formed base can be achieved by laminating paper layers. Formable papers, such as FibreForm® (available from BillerudKorsnäs®) allow stretch and formability. Typically, formable papers are available in grades with basis weight of 80, 100, 150 or 200 g/m$^2$. The formed base should have stiffness and rigidity suitable for the application. Cardboard based trays preferably have a basis weight above 200 g/m$^2$. Rigidity of the formable paper based component can be adjusted with the basis weight and density of the paper layer or the paper layers and the accompanying polymer based layers. The required rigidity is largely dependent on the application and the size/design of the tray.

The formed base of the tray composite can be a polymeric material formed, or formable, into any of a variety of tray shaped configurations having at least one side(s) and a bottom. The polymeric base may be part manufactured from non-polymer fibers. The polymeric base can be described by thickness (prior to forming) and will be about 8 mils to about 50 mils (i.e., 200 to 1250 micron) thick to have a desired minimum rigidity. While a variety of materials are possible as known in the art, some good materials are monolayer polyester, monolayer high-density polyethylene, crystalline polyester (CPET), and polypropylene. The polymeric base is often removably affixed to the polymeric based liner and then the tray composite is given its formed shape. However, the polymeric base may be pre-formed into its desired shape and the polymeric based liner then removably affixed thereto. For example, the polymeric based liner can be heated and attached to the formed base by any methods. A particularly useful method is one that mimics the vacuum skin packaging (VSP) process used to apply lids to containers. In this case, there is no packaged item in the tray and the polymeric based liner material is heated and vacuum formed into the tray composite, simultaneously connecting to the formed base. Rigidity of the polymeric base can be adjusted with the basis weight, thickness and/or density of the tray. The required rigidity is largely dependent on the application and the size/design of the tray. In particular, the formed base when made of a polymeric material and in its formed shape, is defined to be "rigid" if, when subjected to a distortion force for two minutes of the magnitude normally encountered within the environment for use of the tray composite, the polymeric formed base is capable of resisting this force, applied in any orientation to the formed base, by substantially maintaining its formational shape without bending or collapse. The formed base when made of a polymeric material and in its formed shape, is defined to be "semi-rigid" if, when subjected to a distortion force for two minutes of the magnitude normally encountered within the environment for use of the tray composite, the polymeric formed base has some flexibility to bend and/or collapse but is still capable of resisting at least 50% of this force, applied in any orientation to the formed base, and substantially maintaining its formational shape after discontinuance of the force.

As used herein, the term "layer" refers to a thickness of a material or blend of materials that may be continuous or discontinuous. As used herein, the phrase "surface layer" as applied to film layers of the present disclosure refers to any film layer having less than two of its principal surfaces directly adhered to another layer of the film. In contrast, the phrase "inner layer," as applied to film layers, refers to any film layer having both its principal surfaces directly adhered to another layer of the film. The polymeric based liner can be produced using traditional film processing techniques such as blown film, cast film, or lamination. As used herein, the term "exterior surface" refers to a surface of the tray composite (such as the fiber based tray component or the polymeric based liner) that does not have contact with another tray component.

Likewise, the "exterior surface layer" refers to the layer of the polymeric based liner that does not have contact with another tray component. The exterior surface layer of the polymeric based liner may have contact with other package components, such as the lid. As used herein, the term "interior surface" refers to a surface of the tray composite that is in contact with another tray component (such as the surfaces of the formed base and the polymeric based liner that are connected to each other). Likewise the "interior surface layer" refers to the layer of the polymeric based liner that is in contact with another tray component, such as the formed base.

A preferred embodiment of the liner is produced by coextrusion. The exterior surface layer, the interior surface layer and any optional inner layers of the liner may be coextruded together (fully coextruded). Alternatively, any two or more adjacent layers or sub-layers could be coextruded together and the remaining layers or sub-layers subsequently added in a different processing step, such as adhesive lamination, extrusion lamination, or coating.

Figure 9:
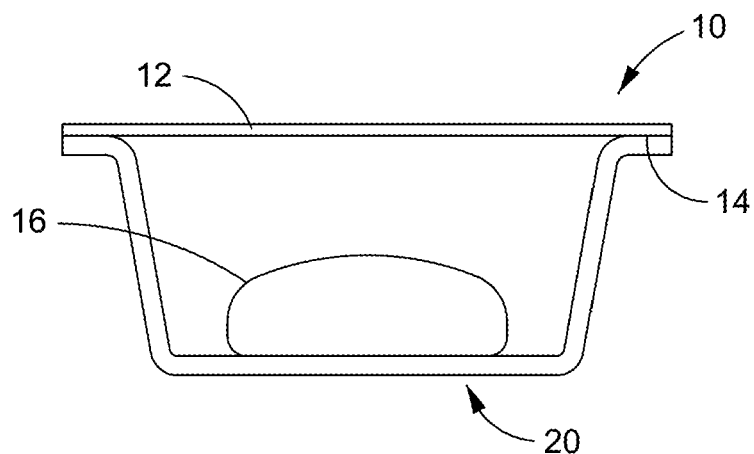
FIG. 9 is a cross-sectional view of the invention seen in FIG. 1, with a food product and a lid.
Figure 10:
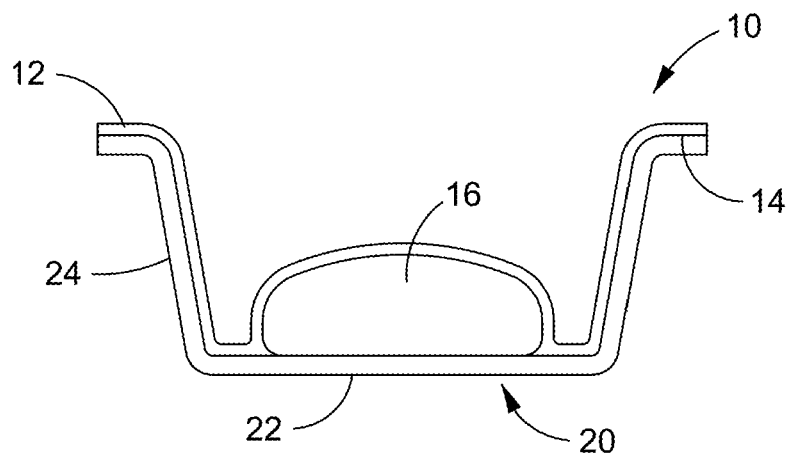
FIG. 10 is a cross-sectional view of the invention seen in FIG. 9, with the food product and an alternate lid embodiment.

The exterior surface layer (42) of the liner (40) can also be the layer that is connected to the lid (12) and any other components of the package (10). As shown in the embodiment of FIG. 9, the lid (12) is connected to the tray composite (20) using a hermetic seal (14) at the flange (26)(see also FIG. 1) of the tray. As shown in the embodiment of FIG. 10, the lid (12) is connected to the tray composite (20) using hermetic seal (14) along the flange and portions of the sidewalls (24) and bottom (22) of the tray (20). The hermetic seal may be formed by any known method including heat sealing, ultrasonic sealing, RF welding, etc. The bond between the lid (12) and the tray composite (20) may be manually peelable for removal at the time of use. The material of the exterior surface of the liner can be configured for appropriate bonding to the lid and other package components such that a hermetic package can be formed for enclosing the food product (16) therein.

Prior to bonding to the formed base, the interior surface (45) of the polymeric based liner may be surface treated to increase the surface energy. This is advantageous to be better able to control the adhesion between the surface (45) and component (30). As used herein, the phrase "surface treated" as applied to film layers refers to any technique which alters the surface energy (or surface tension) of a film layer and may include techniques such as, but is not limited to, corona, flame, and plasma treatment, ozone, ultra-high frequency electrical discharge, UV or laser bombardment, chemical priming, and the like. Surface treatment also helps enable the polymeric based liner to be connected to the formed base of the tray, under heated conditions, without the use of an additional adhesive material. That is, the polymeric based liner may be directly connected to the formed base. In other words, the polymeric based liner may be adjacent to the formed base. In one or more embodiments, the polymeric based liner and the formed base are connected and directly adjacent to each other. As used herein, "connected" or "directly connected" means that the components are attached to each other and would require a force to separate them. As used herein, "adjacent" or "directly adjacent" means that there is no intervening material between the components. As used herein, the terms "adhere," "adhered," "adhering," "adheres," "adherence," and "adhesion" as applied to film layers or other components of the present invention, are defined as affixing of the subject layer surface to another surface, with or without adhesive.

The polymeric based liner can be thermally laminated to a fiber based web, aka the formed base when of a paper based material. The resulting composite tray material can be subsequently formed into a tray by thermoforming, press forming or other similar techniques. Sufficient heat for lamination of the polymeric based liner to the formed base can be applied to the relatively thin liner, meaning that the process is not dependent on the thickness of the formed base. The type and thickness of the formed base generally does not affect the speed or efficiency of the thermal lamination process. Heat can be applied to the polymeric based liner in a number of ways including, but not limited to convection heating by an industrial oven or direct contact heating. Direct contact heating may provide the most controlled heating. One method of direct contact heating can be done simultaneously with the lamination by using a heated nip roller system at the point where the polymeric based liner comes in contact with the formed base. The heated roller of the nipping system can be in contact with the exterior surface of the polymeric based liner and the backing rollers are located on the exterior surface of the formed base. Lamination can be controlled by the heated roller temperature, line speed (dwell time) and nip pressure. A textured or banded heated nip roller may allow for spot-bonding of the polymeric based liner to the formed base. This may allow for the provision of a peel tab at the edge of the tray component for ease of separation.

Using the heating and connecting techniques described herein, the polymeric based liner can be connected to the formed base without the assistance of an additional adhesive component. To enable the adhesive free connection process, the polymeric based liner must have an interior surface that will bond to the formed base at a level that will survive the rigors of the application for which the tray composite is being used.

Figure 14:
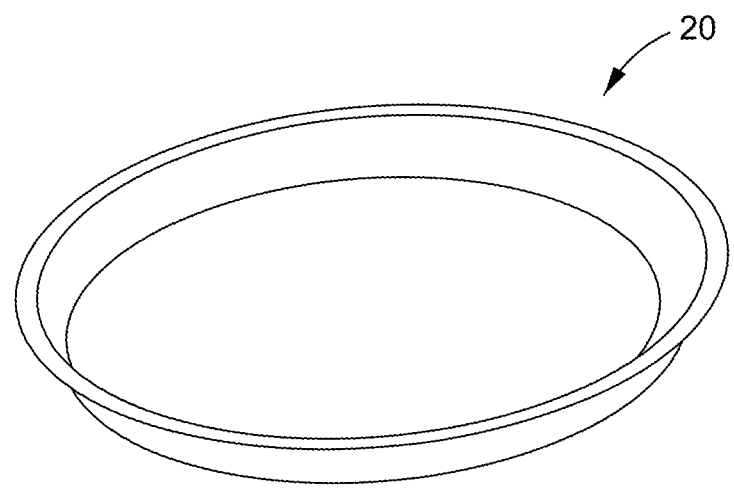
FIG. 14 is a view of another embodiment of a tray composite.
Figure 15:
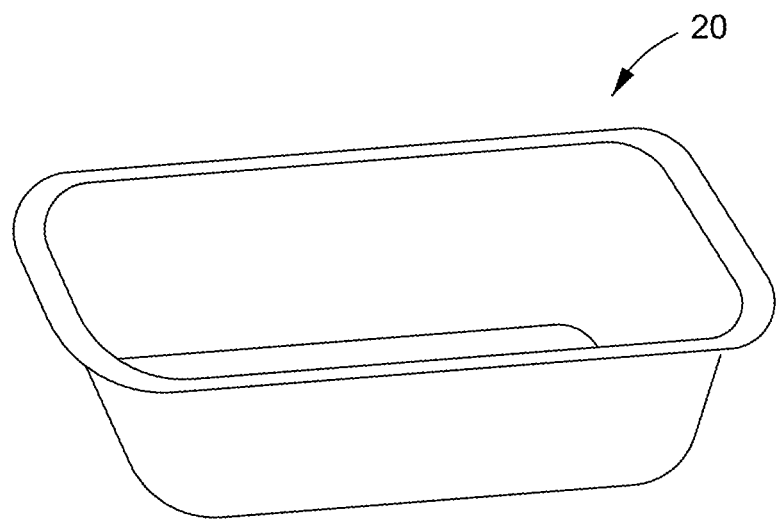
FIG. 15 is a view of yet another embodiment of a tray composite.
Figure 16:
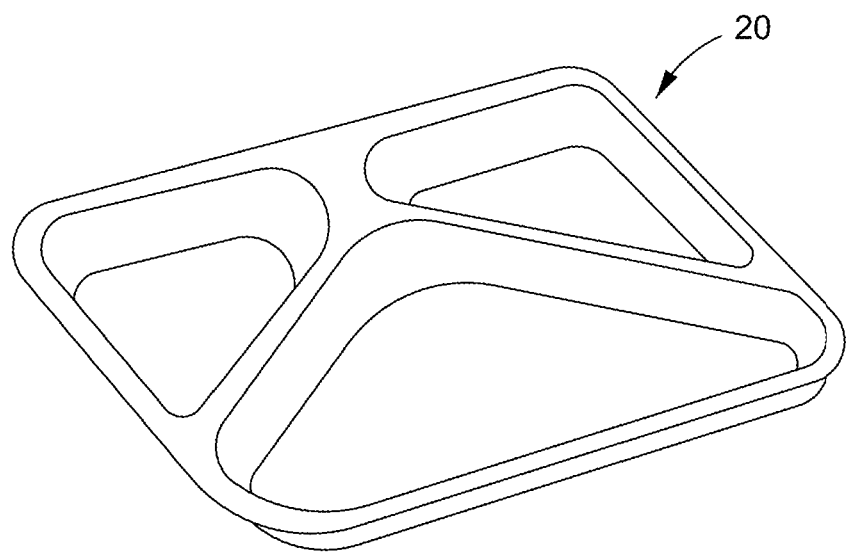
FIG. 16 is a view of still another embodiment of a tray composite.

The tray composite may be a receptacle, having a bottom, at least one sidewall and a flange as shown in FIGS. 14-16. The tray may have more than one compartment as shown in FIG. 16. It has also been contemplated that the tray composite can be essentially a flat sheet with no formed areas, as in FIG. 12. In this case, the lid is sealed to the tray composite in the locations surrounding the packaged product.

Figure 11:
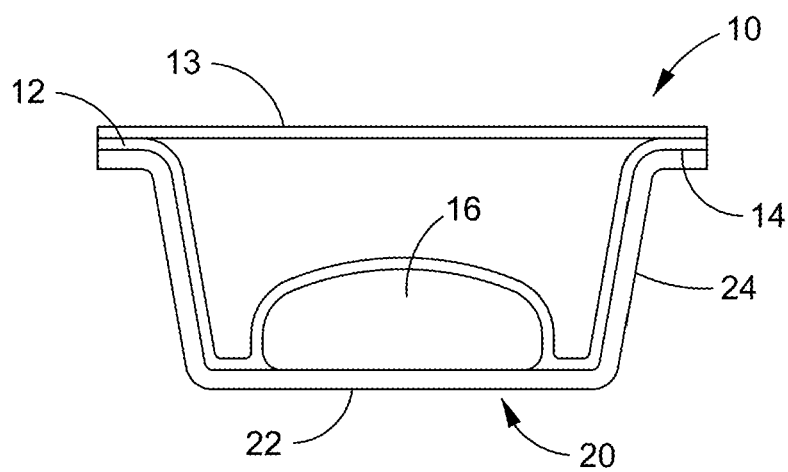
FIG. 11 is a cross-sectional view of the invention seen in FIG. 10, with the food product and an alternate lid embodiment.
Figure 12:
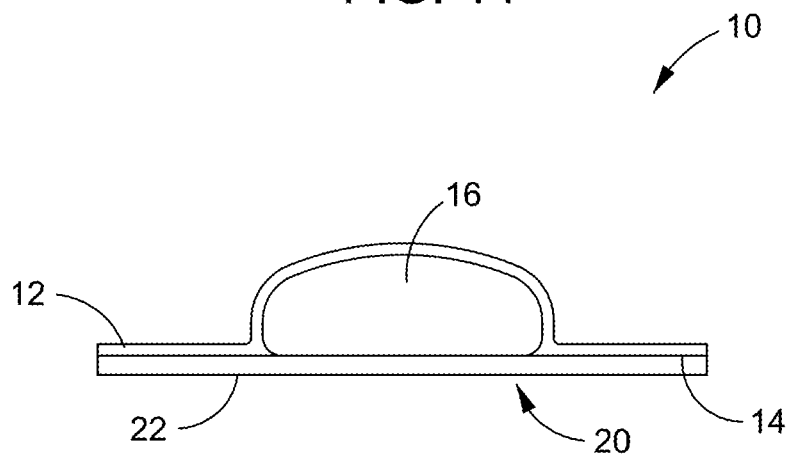
FIG. 12 is a cross-sectional view of an alternate embodiment of the invention seen in FIG. 1, with a food product and a lid.

The lid can be any type of lidding that can provide hermetic seals in combination with the sealant surface of the polymeric based liner, adequate shelf life for the product prior to reheating and heat resistance up to 220° C. The seals described in this application may be formed by heat, impulse, ultrasonic, pressure or other seal-forming methods as known in the art. The lid may slightly or fully conform to the product within the package. The lid may be applied in a vacuum skin packaging (VSP) process or any other process known to the packaging industry. Multiple lids may be applied, such as a combination of a VSP lid (12) and a flat lid (13), as shown in FIG. 11.

The lid may be of a polymeric material, fiber based material, metal based material or combinations thereof. The lid may provide barrier, puncture resistance, or any other type of characteristic that would aid in protecting the product packaged therein. The lid may be opaque or transparent (or any gradient of transparency) and may be tinted or otherwise pigmented. The lid may have printed indicia on either side or within the layers thereof. The lid may remain in a flat plane across the top of the tray (in a plane parallel to the tray flange). The lid may be applied in a VSP process, conforming to the product and tray contours. It is further contemplated that the lid may be identical, or similar to, the tray component as described herein. This would result in a clamshell type packaging configuration.

The packages described herein can be filled with a wide variety of products. The products may be, but are not limited to, any type of consumer or industrial item, food or medical product, pharmaceutical, or heatable therapeutic device. The products can be items that consumers will want to heat, reheat or cook in an oven or warming device. As used herein, the term "oven" or "ovenable" refers to the process of heating, by any means, with the intent of raising the temperature of, or cooking, the contents within the package. Typical means for heating include conventional ovens using radiant heat, convection style ovens and microwave ovens. The oven conditions described herein refer to the environment around the package (external heating) or interior to the package (heating the packaged product via microwave, for example). Prior to oven heating, the lid component of the tray can be fully removed, partially removed (venting) or remain fully connected to the tray. Intense heating cycles may cause lids that are still connected to partially or fully disconnect from the tray—this can depend on the product within.

In yet another embodiment of the invention, is disclosed a method of using the tray composite taught herein. The method includes obtaining a polymeric based liner, the liner including an exterior surface layer and an interior surface layer; obtaining a formed base that is removably affixed to the interior surface layer of the polymeric based liner; and manually separating the polymeric based liner and the formed base after they have been removably affixed together by a first portion of the interior surface layer remaining affixed to the formed base and a second portion of the interior surface layer separating from the first portion of the interior surface layer. Additional features of the method are claimed below and will be understood as previously taught and described above and in the drawings.

ADDITIONAL DISCUSSION OF THE EMBODIMENTS

Embodiment 1: A tray composite that comprises: (a) a polymeric based liner including (i) an exterior surface layer and (ii) an interior surface layer; (b) a formed base removably affixed to the interior surface layer of the polymeric based liner; and (c) the polymeric based liner and the formed base are manually separable after they have been removably affixed together by a first portion of the interior surface layer remaining affixed to the formed base and a second portion of the interior surface layer separating from the first portion of the interior surface layer.

Embodiment 2: The tray composite of embodiment 1, wherein the polymeric based liner further comprises at least one inner layer located between the exterior surface layer and the interior surface layer.

Embodiment 3: The tray composite of embodiment 2, wherein the at least one inner layer comprises at least one barrier layer.

Embodiment 4: The tray composite of any of embodiments 1 to 2, wherein the interior surface layer has at least two sub-layers and a separation interface formed between the sub-layers such that manually separating the polymeric based liner and the formed base occurs at the separation interface within the interior surface layer.

Embodiment 5: The tray composite of any of the previous embodiments, wherein the first portion of the interior surface layer and the formed base are composed of materials having a compatible recycling profile.

Embodiment 6: The tray composite of any of the previous embodiments, wherein the formed base is a member from the group consisting of: a semi-rigid polymeric material, a rigid polymeric material, a fiber based component and a formable paper.

Embodiment 7: The tray composite of any of the previous embodiments, wherein a force to separate the polymeric based liner and the formed base is at least 10 N/m and no more than 500 N/m.

Embodiment 8: The tray composite of embodiment 7, wherein the force to separate the polymeric based liner and the formed base is at least 30 N/m and no more than 450 N/m.

Embodiment 9: The tray composite of any of the previous embodiments, wherein the exterior surface layer substantially maintains its structural integrity and is substantially uncompromised by the formed base being manually separated from the second portion of the interior surface layer.

Embodiment 10: The tray composite of any of the previous embodiments, wherein the interior surface of the formed base substantially maintains its structural integrity and is substantially uncompromised when the second portion of the interior surface layer is manually separated from first portion of the polymeric based liner.

Embodiment 11: The tray composite of any of the previous embodiments, wherein the interior surface layer is a substantially homogenous layer.

Embodiment 12: The tray composite of any of the previous embodiments, wherein the interior surface layer includes at least two different polymeric constituents.

Embodiment 13: The tray composite of embodiment 12, wherein the formed base comprises a polymeric constituent and the formed base polymeric constituent is the same as the polymeric constituent of the first portion of the interior surface layer remaining affixed to the formed base.

Embodiment 14: The tray composite of any of the previous embodiments, wherein the polymeric based liner and the formed base are manually separable such that when separated an amount of the first portion of the interior surface layer affixed to the formed base is no more than 20% and more preferably no more than 5% of a weight of the formed base.

Embodiment 15: The tray composite of embodiment 14, wherein the amount of the first portion of the interior surface layer affixed to the formed base is no more than 2% of a weight of the formed base.

Embodiment 16: The tray composite of any of the previous embodiments, wherein the formed base is removably affixed to the interior surface layer across at least 90% of a surface area where the formed base is adjacent to the interior surface layer.

Embodiment 17: The tray composite of embodiment 16, wherein the formed base is removably affixed to the interior surface layer across substantially all of the surface area where the formed base is adjacent to the interior surface layer.

Embodiment 18: The tray composite of any of the previous embodiments, wherein the tray composite is ovenable.

Embodiment 19: The tray composite of embodiment 18, wherein the polymeric based liner is at least partially cross-linked.

Embodiment 20: The tray composite of embodiments 18 to 19, wherein after exposure to 220° C. oven conditions for 45 minutes, the polymeric based liner remains removably affixed to the formed base to between 80% and 300% of the extent in N/m that the polymeric based liner and the formed base were removably affixed together prior to oven exposure.

Embodiment 21: The tray composite of 20, wherein the polymeric based liner remains removably affixed to the formed base to between 90% and 250% of the extent in N/m that the polymeric based liner and the formed base were removably affixed together prior to oven exposure.

Embodiment 22: The tray composite of any of embodiments 18 to 21, wherein the polymeric based liner remains removably affixed to the formed base over at least 80% of the surface area that the polymeric based liner and the formed base were removably affixed prior to oven exposure.

Embodiment 23: A tray composite that comprises: (a) a polymeric based liner including (i) an exterior surface layer and (ii) an interior surface layer; (b) a formed base removably affixed to the interior surface layer of the polymeric based liner across at least 90% of a surface area where the formed base is adjacent to the interior surface layer; and (c) the polymeric based liner and the formed base are manually separable after they have been removably affixed together by a first portion of the interior surface layer remaining affixed to the formed base and a second portion of the interior surface layer separating from the first portion of the interior surface layer, wherein: (i) when separated an amount of the first portion of the interior surface layer affixed to the formed base is no more than 20% of a weight of the formed base, and (ii) the force to separate the polymeric based liner and the formed base is at least 30 N/m and no more than 450 N/m.

Embodiment 24: The tray composite of embodiment 23, wherein the formed base is made of semi-rigid to rigid polymeric material.

Embodiment 25: The tray composite of embodiment 23, wherein the formed base is made of a formable paper.

Embodiment 26: A tray composite that comprises: (a) a polymeric based liner that is at least partially crosslinked including (i) an exterior surface layer and (ii) an interior surface layer; (b) a formed base removably affixed to the interior surface layer of the polymeric based liner across at least 90% of a surface area where the formed base is adjacent to the interior surface layer; and (c) the polymeric based liner and the formed base are manually separable after they have been removably affixed together by a first portion of the interior surface layer remaining affixed to the formed base and a second portion of the interior surface layer separating from the first portion of the interior surface layer, wherein after exposure to 220° C. oven conditions for 45 minutes the polymeric based liner remains removably affixed to the formed base over at least 80% of the surface area that the polymeric based liner and the formed base were removably affixed prior to oven exposure.

Embodiment 27: A package comprising: (a) a tray composite of any of the previous embodiments; (b) a lid; and (c) a food product; wherein the food product is hermetically sealed between the lid and the exterior surface layer of the polymeric based liner.

Embodiment 28: A method of using a tray composite that comprises: (a) obtaining a polymeric based liner including (i) an exterior surface layer and (ii) an interior surface layer; (b) obtaining a formed base that is removably affixed to the interior surface layer of the polymeric based liner; and (c) manually separating the polymeric based liner and the formed base after they have been removably affixed together by a first portion of the interior surface layer remaining affixed to the formed base and a second portion of the interior surface layer separating from the first portion of the interior surface layer.

Embodiment 29: The method of embodiment 28, wherein a force to separate the polymeric based liner and the formed base is at least 30 N/m and no more than 450 N/m.

Embodiment 30: The method of any of embodiments 28 to 29, further comprising substantially maintaining and substantially uncompromising the structural integrity of the exterior surface layer when the formed base is manually separated from the second portion of the interior surface layer.

Embodiment 31: The method of any of embodiments 28 to 30, wherein manually separating the polymeric based liner and the formed base comprises having an amount of the first portion of the interior surface layer that is affixed to the formed base be no more than 5% of a weight of the formed base.

Embodiment 32: The method of any of embodiments 28 to 31, further comprising exposing the tray composite to 220° C. oven conditions for 45 minutes and the polymeric based liner remaining removably affixed to the formed base to between 90% and 300% of the extent in N/m that the polymeric based liner and the formed base were removably affixed prior to the exposing.

Embodiment 33: The method of any of embodiments 28 to 32, further comprising maintaining the polymeric based liner removably affixed to the formed base over at least 80% of the surface area that the polymeric based liner and the formed base were removably affixed prior to the exposing.

Embodiment 34: The method of any of embodiments 28 to 33, wherein the polymeric based liner comprises at least one inner layer located between the exterior surface layer and the interior surface layer, at least one of the inner layers comprises part of the first portion of the interior surface layer and forms a separation interface between layers, and manually separating the polymeric based liner and the formed base at the separation interface.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the packaging arts, and all such modifications and other embodiments are intended and deemed to be within the scope of the present invention.

The invention claimed is:

1. A tray composite that comprises:
 a) a polymeric based liner comprising:
  i) an exterior surface layer; and
  ii) an interior surface layer;
 b) a formed base removably affixed to the interior surface layer of the polymeric based liner; and
 c) the polymeric based liner and the formed base are manually separable after they have been removably affixed together by a first portion of the interior surface layer remaining affixed to the formed base and a second portion of the interior surface layer separating from the first portion of the interior surface layer.

2. The tray composite of claim 1, wherein the polymeric based liner further comprises at least one inner layer located between the exterior surface layer and the interior surface layer.

3. The tray composite of claim 2, wherein the at least one inner layer comprises at least one barrier layer.

4. The tray composite of claim 1, wherein the interior surface layer has at least two sub-layers and a separation interface formed between the sub-layers such that manually separating the polymeric based liner and the formed base occurs at the separation interface within the interior surface layer.

5. The tray composite of claim 1, wherein the first portion of the interior surface layer and the formed base are composed of materials having a compatible recycling profile.

6. The tray composite of claim 1, wherein the formed base is a member from the group consisting of: a semi-rigid polymeric material, a rigid polymeric material, a fiber based component and a formable paper.

7. The tray composite of claim 1, wherein a force to separate the polymeric based liner and the formed base is at least 10 N/m and no more than 500 N/m.

8. The tray composite of claim 1, wherein the polymeric based liner and the formed base are manually separable such that when separated an amount of the first portion of the interior surface layer affixed to the formed base is no more than 20% of a weight of the formed base.

9. The tray composite of claim 1, wherein the formed base is removably affixed to the interior surface layer across at least 90% of a surface area where the formed base is adjacent to the interior surface layer.

10. The tray composite of claim 9, wherein the formed base is removably affixed to the interior surface layer across substantially all of the surface area where the formed base is adjacent to the interior surface layer.

11. The tray composite of claim 1, wherein the tray composite is ovenable.

12. The tray composite of claim 11, wherein the polymeric based liner is at least partially crosslinked.

13. The tray composite of claim 12, wherein after exposure to 220° C. oven conditions for 45 minutes, the polymeric based liner remains removably affixed to the formed base to between 80% and 300% of the extent in N/m that the polymeric based liner and the formed base were removably affixed together prior to oven exposure.

14. The tray composite of 13, wherein the polymeric based liner remains removably affixed to the formed base to between 90% and 250% of the extent in N/m that the polymeric based liner and the formed base were removably affixed together prior to oven exposure.

15. The tray composite of claim 11, wherein the polymeric based liner remains removably affixed to the formed base over at least 80% of the surface area that the polymeric based liner and the formed base were removably affixed prior to oven exposure.

* * * * *

UNITED STATES PATENT AND TRADEMARK OFFICE
CERTIFICATE OF CORRECTION

PATENT NO. : 11,939,112 B2
APPLICATION NO. : 17/312764
DATED : March 26, 2024
INVENTOR(S) : Tara Kay Cruz et al.

Page 1 of 1

It is certified that error appears in the above-identified patent and that said Letters Patent is hereby corrected as shown below:

In the Specification

Column 2, Line 54 Delete "insure" and insert -- ensure --, therefor.

Column 5, Line 5 Delete "insuring" and insert -- ensuring --, therefor.

Column 5, Line 16 Delete "insure" and insert -- ensure --, therefor.

Column 6, Line 3 Delete "sub-later" and insert -- sub-layer --, therefor.

Signed and Sealed this
Twenty-ninth Day of April, 2025

Coke Morgan Stewart
*Acting Director of the United States Patent and Trademark Office*